United States Patent
Ghose et al.

(10) Patent No.: US 9,576,333 B2
(45) Date of Patent: Feb. 21, 2017

(54) DATA PROCESSING SYSTEM AND METHOD THEREOF

(71) Applicant: TEXAS INSTRUMENTS INCORPORATED, Dallas, TX (US)

(72) Inventors: Arunabha Ghose, Bangalore (IN); Chetan Vinchhi, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 252 days.

(21) Appl. No.: 14/587,710

(22) Filed: Dec. 31, 2014

(65) Prior Publication Data
US 2016/0189329 A1    Jun. 30, 2016

(51) Int. Cl.
*G06T 1/20*    (2006.01)

(52) U.S. Cl.
CPC ............. *G06T 1/20* (2013.01); *G06T 2200/28* (2013.01)

(58) Field of Classification Search
CPC .................................... G06T 1/20; G06T 1/60
USPC ................... 345/501, 504, 541, 545
See application file for complete search history.

(56) References Cited

U.S. PATENT DOCUMENTS

| | | | | |
|---|---|---|---|---|
| 6,700,580 B2* | 3/2004 | Lefebvre | .................. | G06T 1/20 345/419 |
| 8,681,160 B2* | 3/2014 | Hussain | .................. | G06T 1/20 345/504 |
| 9,030,481 B2* | 5/2015 | Kwa | ....................... | H04N 5/46 345/531 |
| 2014/0306967 A1* | 10/2014 | Oh | ........................ | G06F 3/1454 345/504 |

* cited by examiner

*Primary Examiner* — Jacinta M Crawford
(74) *Attorney, Agent, or Firm* — Robert D. Marshall, Jr.; Charles A. Brill; Frank D. Cimino

(57) ABSTRACT

Several systems and methods for data processing are disclosed. In an embodiment, a data processing system includes a host processor, a plurality of slave processors and a plurality of frame buffers. Each slave processor is associated with at least one data co-processor configured to process data sub-frames based on one processing stage. For a first data sub-frame, a first messaging call is provisioned to the host processor by each slave processor subsequent to execution of a processing stage by an associated data co-processor. The host processor is configured to provision a second messaging call to a next slave processor upon receiving the first messaging call. Further, for each subsequent data sub-frame, a third messaging call is provisioned by each slave processor to a next slave processor subsequent to execution of the corresponding processing stage by the associated data co-processor for facilitating execution of the next processing stage.

20 Claims, 6 Drawing Sheets

DATA PROCESSING SYSTEM AND METHOD THEREOF

TECHNICAL FIELD

The present disclosure generally relates to the field of data processing.

BACKGROUND

Processing of data, such as video data or image data, may be performed for a variety of reasons. For example, video and/or image data may be compressed in order to save bandwidth during transmission or to save memory space during storage. In other examples, processing of video/image data may include reducing a noise component therein, or, performing any of scaling/de-scaling, color conversion, de-interlacing, composition/decomposition of the video/image data. Typically, a data processer includes a high level framework and a low level framework for performing such data processing. Generally, the high level framework includes a host processor which runs on a high level operating system such as LINUX operating system, whereas the low level framework includes a plurality of slave processors and hardware accelerators which run on a low level operating system such as Basic Input/Output System (BIOS) operating system. In non-tunneled data processing architecture, a completion of a processing stage by a slave processor/hardware accelerator is signaled by the low level framework to the high level framework. The high level framework then intimates the next slave processor/hardware accelerator in the low level framework for performing the next processing stage. If a processing rate of each processing stage is F frames/second and there are N processing stages, then a total latency of the data processing pipeline is (1/F*N) seconds. To reduce the total latency of the data processing pipeline, signals corresponding to output data produced after processing a part of a data frame (for example, a data sub-frame) are sent to the next processing stage. This allows processing to start in the next stage of the data processing pipeline earlier. If a particular processing stage produces S data sub-frames, the latency of the processing stage comes down from (1/F) seconds to (1/(F*S)) seconds. However, such an approach results in an increase in the number of times that signals are sent through the high level framework, which proportionately increases the processing cycles on the host processor, in turn affecting performance of the data processor.

SUMMARY

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

Various systems and methods for data processing are disclosed. In an embodiment, a data processing system is disclosed. The data processing system includes a host processor and a plurality of slave processors. The plurality of slave processors is communicatively associated with the host processor. Each slave processor is associated with at least one data co-processor. Each data co-processor is configured to process data sub-frames based on one processing stage from among a plurality of processing stages and provision said processed data sub-frames to a corresponding slave processor. The data processing system also includes a plurality of frame buffers. One or more frame buffers from among the plurality of frame buffers are shared between pairs of slave processors associated with successive processing stages from among the plurality of processing stages. Further, for a first data sub-frame from among a plurality of data sub-frames in a frame associated with data being processed, a first messaging call indicating a presence of a processed first data sub-frame in an associated frame buffer is provisioned to the host processor by each slave processor subsequent to execution of a processing stage by an associated data co-processor. The host processor is configured to provision a second messaging call to a next slave processor upon receiving the first messaging call for requesting the corresponding frame buffer to be emptied for facilitating execution of a next processing stage. The provisioning of the first messaging call and the second messaging call is performed until the processing of the first data sub-frame based on the plurality of processing stages is completed. Furthermore, for each data sub-frame subsequent to the first data sub-frame in the frame, a third messaging call indicating a presence of a processed data sub-frame in the associated frame buffer is provisioned to the next slave processor by each slave processor subsequent to execution of the processing stage by the associated data co-processor for facilitating execution of the next processing stage until the processing of each data sub-frame subsequent to the first data sub-frame based on the plurality of processing stages is completed.

In an embodiment, a data processing method is disclosed. The data processing method includes facilitating processing of a first data sub-frame from among a plurality of data sub-frames in a frame associated with data being processed, by provisioning a first messaging call by each slave processor from among a plurality of slave processors to a host processor. Each slave processor is associated with at least one data co-processor and each data co-processor is configured to process data sub-frames based on one processing stage from among a plurality of processing stages and provision said processed data sub-frames to a corresponding slave processor. The first messaging call is provisioned by each slave processor subsequent to execution of a processing stage by an associated data co-processor for indicating a presence of a processed first data sub-frame in a frame buffer associated with each slave processor, where the frame buffer is one from among the plurality of frame buffers shared between pairs of slave processors associated with successive processing stages from among the plurality of processing stages. The method further includes provisioning, for the first data sub-frame, a second messaging call from the host processor to a next slave processor upon receiving the first messaging call. The second messaging call is provisioned for requesting the corresponding frame buffer to be emptied for facilitating execution of a next processing stage. The provisioning of the first messaging call and the second messaging call is performed until the processing of the first data sub-frame based on the plurality of processing stages is completed. Furthermore, the method includes facilitating processing of each data sub-frame subsequent to the first data sub-frame in the frame, by provisioning a third messaging call indicating a presence of a processed data sub-frame in the associated frame buffer. The third messaging call provisioned by each slave processor to the next slave processor subsequent to execution of the processing stage by the associated data co-processor for facilitating execution of the next processing stage until the processing of each data sub-frame subsequent to the first data sub-frame based on the plurality of processing stages is completed.

In an embodiment, a data processing system is disclosed. The data processing system includes a host processor, a plurality of slave processors and a plurality of frame buffers. The plurality of slave processors is communicatively associated with the host processor. Each slave processor from among the plurality of slave processors is configured to facilitate processing of data sub-frames based on one processing stage from among a plurality of processing stages to generate processed data sub-frames. At least one frame buffer is shared between pairs of slave processors associated with successive processing stages from among the plurality of processing stages. Each slave processor from among the plurality of slave processors is further configured to store said processed data sub-frame in a shared frame buffer. For first data sub-frame from among a plurality of data sub-frames associated with each frame of data being processed, messaging calls are exchanged between the host processor and the plurality of slave processors for facilitating processing of the first data sub-frame based on the plurality of processing stages. For each data sub-frame subsequent to the first data sub-frame in the each frame, messaging calls are exchanged between the slave processors associated with successive processing stages for facilitating processing of the said each data sub-frame based on the plurality of processing stages.

Other aspects and example embodiments are provided in the drawings and the detailed description that follows.

The drawings referred to in this description are not to be understood as being drawn to scale except if specifically noted, and such drawings are only exemplary in nature.

DETAILED DESCRIPTION

Processing of data, such as video data or image data, may be performed for a variety of reasons. For example, video and/or image data may be compressed in order to save bandwidth during transmission or to save memory space during storage. In other examples, processing of video/image data may include reducing a noise component therein, or, performing any of scaling/de-scaling, color conversion, de-interlacing, composition/decomposition of the video/image data. An example data processing pipeline is explained with reference to FIG. 1.

Figure 1:
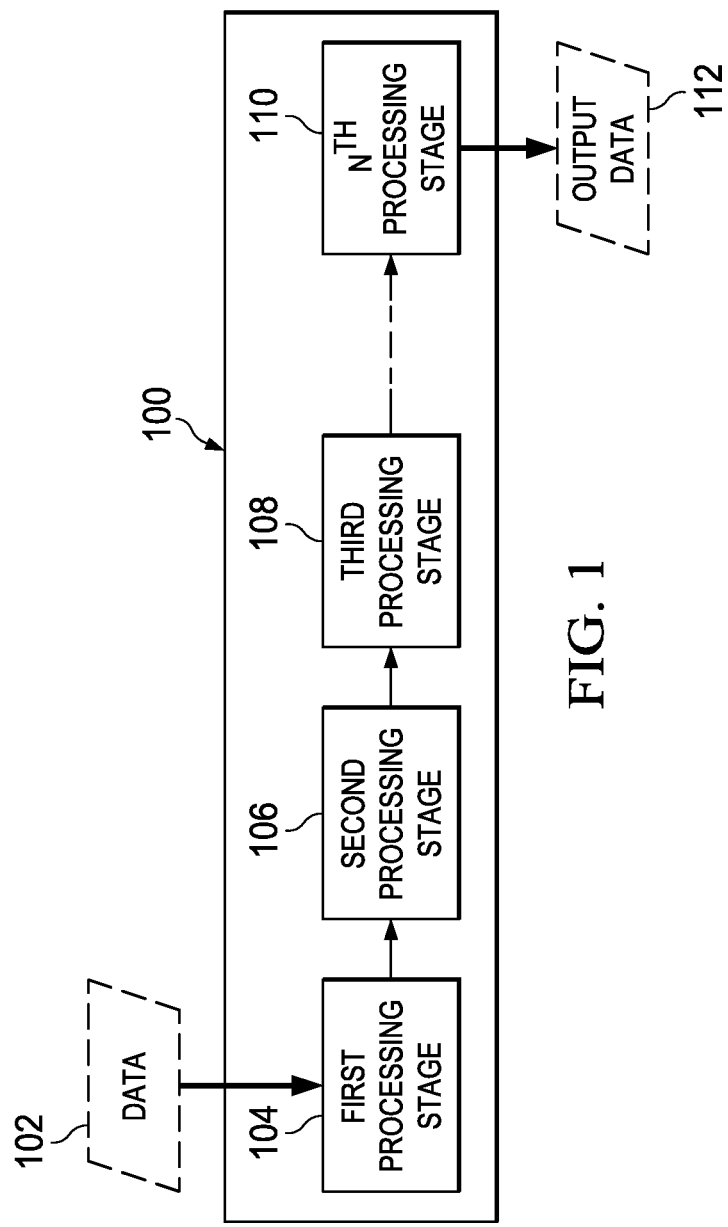
FIG. 1 depicts an example data processing pipeline in accordance with an example scenario.

FIG. 1 depicts an example data processing pipeline 100 in accordance with an example scenario. The data processing pipeline 100 (hereinafter referred to as pipeline 100) includes a plurality of processing stages for processing of data 102. More specifically, the pipeline 100 is depicted to include 'N' processing stages, such as stages 104, 106, 108 and 110 depicted as 'first processing stage' (hereinafter referred to as stage 104), 'second processing stage' (hereinafter referred to as stage 106), 'third processing stage 108' (hereinafter referred to as stage 108) and '$N^{th}$ processing stage 110' (hereinafter referred to as stage 110), respectively, for processing of the data 102. It is understood that the number 'N' is a non-zero integer. The processing of data 102 using the pipeline 100 is explained hereinafter using the example of video data being processed using an example video processing pipeline. It is noted that the processing of data 102 may not be limited to processing of video data only. Indeed, other processing pipelines, such as an image processing pipeline may be utilized for processing of image data and so on and so forth.

Pursuant to an example scenario, the video data may be provided to the plurality of processing stages in the video processing pipeline as a series of still image frames to perform video processing. Pursuant to an example scenario, the plurality of processing stages in the video processing pipeline (similar to the plurality of processing stages 104-110 in the pipeline 100) may include, but are not limited to, a video compression stage, a noise reduction stage, a de-interlacing stage, a scaling stage, a color correction stage, a video composition stage, a video decompression stage and the like.

Pursuant to an example scenario, the video compression stage may involve a compression operation on the video data using standard compression algorithms to produce compressed video data for saving bandwidth during transmission or memory space during storage. Pursuant to an example scenario, the noise reduction stage involves blocking or filtering unwanted noise from the video data. The unwanted noise in the video data may be embodied as an analog noise and/or a digital noise. The analog noise may be in a form of a white Gaussian noise, a color channel interference, noise related to problems affecting brightness in the video data, noise due to unwanted electrical fluctuations and the like, whereas the digital noise may occur due to noise from low light intensity in the video data, noise from loss in digital transmission of the video data and the like. Various known techniques (such as for example, spatio-temporal de-noising and the like) may be used to remove the unwanted noise from the video data during the noise reduction stage.

Pursuant to an example scenario, an interlacing effect may be observed in video data due to overlapping of moving image frames associated with the video data, which may result in undesirable effects such as blurring or flickering in the video data. The de-interlacing stage in the video processing pipeline facilitates in removal of such undesirable effects from the video data. Pursuant to an example scenario, the scaling stage in the video processing pipeline is configured to facilitate in changing a display resolution associated with the video data. Accordingly, the scaling stage may involve operations such as up-scaling (for example, converting the video data from a lower resolution to a higher resolution) or down scaling (for example, converting the video data from a higher resolution to a lower resolution). Pursuant to an example scenario, the color correction stage in the video processing pipeline involves alteration of specific portions of an image frame corresponding to the video data associated with undesirable amount of color. The color correction stage may also involve alteration and enhancement of color associated with specific portions in an image frame of the video data and may also perform creative adjustments in the image frame. The creative adjustments may be applied to one of a contrast, a color, a gamma parameter, or brightness factor associated with the image frame in the video data. In an example scenario, the color correction may be performed on a pixel block-by-pixel block basis or on a frame-by-frame basis. Pursuant to an example scenario, the video composition stage in the video processing pipeline is configured to facilitate combining of a plurality of visual elements from various sources or from within the video data itself into a single image frame of the video data. Further, the composition stage may facilitate in creating an illusion such that the combined visual elements become part of a same scene. Pursuant to an example scenario, the decompression stage in the video processing pipeline may facilitate in restoring a compressed video data to an original format. In an example scenario, the compression and decompression of the video data may be facilitated by employing a compression/decompression algorithm (also referred as codec). The codec may be embodied as a lossless algorithm or a lossy algorithm. Some examples of lossless and lossy codec algorithms may include, but are not limited to, Quicktime, H.264 lossless, H.263, H.262, AVIzlib, Moving picture experts group (MPEG)-1 part 2, MPEG4 part 2, Xvid, Windows media video (WMV) codec and the like.

Pursuant to an example scenario, the video data upon being subjected to a plurality of processing stages may generate output video data (also referred to herein as processed video data), as depicted by output data 112 at the end of the pipeline 100 in FIG. 1. A processing mechanism may be configured to facilitate execution of the pipeline 100, or more specifically, the execution of the plurality of processing stages 104-110. Typical processing mechanism includes a high level framework and a low level framework for executing a pipeline, such as the pipeline 100. Generally, the high level framework includes a host processor which runs on a high level operating system such as LINUX operating system, whereas the low level framework includes a plurality of slave processors and hardware accelerators which run on a low level operating system such as Basic Input/Output System (BIOS) operating system. In non-tunneled data processing architecture, a completion of a processing stage by a slave processor/hardware accelerator is signaled by the low level framework to the high level framework. The high level framework then intimates the next slave processor/hardware accelerator in the low level framework for performing the next processing stage.

Pursuant to an example scenario, when the processing rate of each processing stage is F frames/second and there are N processing stages, a total latency of such a data processing pipeline is (1/F*N) seconds. To reduce the total latency of the data processing pipeline, signals corresponding to output data produced after processing a part of a data frame (for example, a data sub-frame) is sent to the next processing stage. This allows processing to start in the next stage of the pipeline earlier. If a particular processing stage produces S data sub-frames, the latency of the processing stage comes down from (1/F) seconds to (1/(F*S)) seconds. However, such an approach results in an increase in the number of times that signals are sent through the high level framework, which proportionately increases the processing cycles on the host processor, in turn affecting a performance of the host processor.

Various embodiments of the present technology, however, provide systems and methods for data processing that are capable of overcoming these and other obstacles and providing additional benefits. Accordingly, a non-tunneled architecture (for example, exchanging data between the high level framework and the low level framework) is executed only at a frame level, whereas a tunneled architecture is proposed at a sub-frame level, thereby reducing processing cycles of the host processor, in turn improving the performance of the host processor. A data processing system is explained with reference to FIG. 2.

Figure 2:
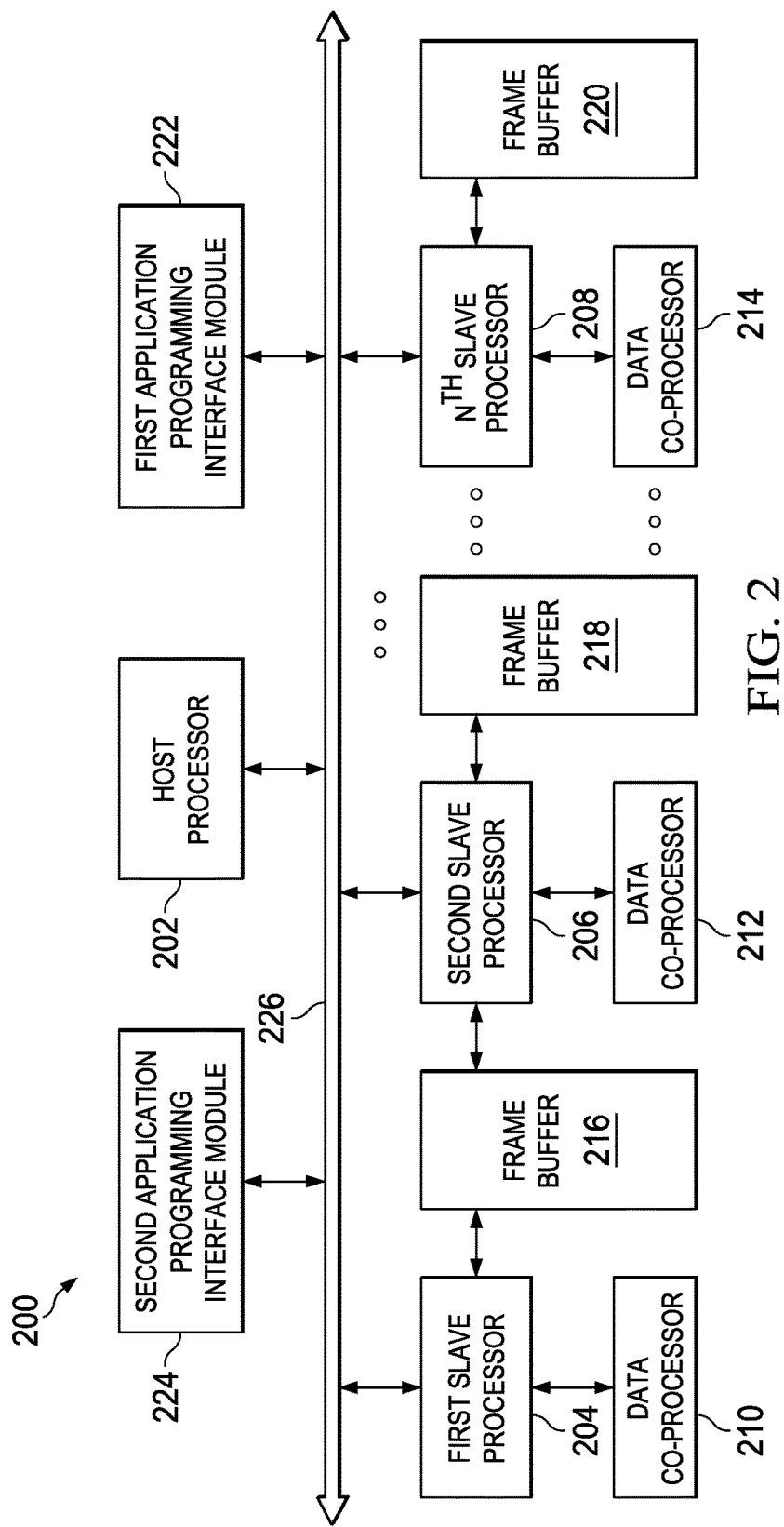
FIG. 2 is a simplified block diagram of an example data processing system in accordance with an embodiment.

FIG. 2 is a simplified block diagram of an example data processing system 200 (hereinafter referred to as system 200) in accordance with an embodiment. The system 200 is configured to process data (such as for example, by using one or more processing stages as explained with reference to FIG. 1) to generate an output of processed data. Examples of data may include, but are not limited to video data, image data and the like. In FIG. 2, the system 200 is depicted to include a host processor 202 and a plurality of slave processors, such as a first slave processor 204, a second slave processor 206 to $N^{th}$ slave processor 208. The slave processors 204, 206 to 208 are collectively referred to herein as slave processors 204-208. Each slave processor is further depicted to be communicatively associated with at least one data co-processor. For example, in FIG. 2, the first slave processor 204 is communicatively associated with data co-processor 210, the second slave processor 206 is communicatively associated with data co-processor 212 and the $N^{th}$ slave processor 208 is communicatively associated with data co-processor 214. In FIG. 2, each slave processor is depicted to be communicatively associated with only one data co-processor, however, it is noted that each slave processor may be communicatively associated with one or more data co-processors. The data co-processors 210, 212 to 214 are collectively referred to herein as data co-processors 210-214. Each data co-processor from among the data co-processors 210-214 is configured to process data sub-frames based on one processing stage from among a plurality of processing stages associated with data processing (such as the processing stages explained with reference to FIG. 1). More specifically, each data co-processor is configured to execute a processing stage by processing data frames or data sub-frames (referred to as frames and sub-frames, respectively, hereinafter) based on the associated processing stage and provision said processed sub-frames (i.e. output data corresponding to the processed sub-frames) to the corresponding slave processor. For example, the data co-processor 210 may be configured to execute a compression stage from among the plurality of processing stages associated with a video processing pipeline. Accordingly, upon receiving a frame/sub-frame corresponding to video data, the data co-processor 210 may compress the frame/sub-frame as per the requirement associated with the corresponding stage (i.e. the compression stage) and provide the compressed frame/sub-frame to the first slave processor 204. In an embodiment, each data co-processor is a hardware accelerator configured to execute one processing stage associated with processing of video data. As explained with reference to FIG. 1, a processing stage associated with video data may be one from among, but not limited to, a video compression stage, a video decompression stage, an interlacing stage, a noise filter stage, a video composition stage and a video decomposition stage.

The system 200 is further depicted to include a plurality of frame buffers, such as a frame buffer 216, a frame buffer 218 and a frame buffer 220. It is understood that the frame buffers 216, 218 to 220 may correspond to storage space (for example, memory) for storing information related to processed data. Further, it is noted that though the frame buffers 216, 218 to 220 (hereinafter collectively referred to as frame buffers 216-220) are depicted as separate components, the frame buffers 216-220 may together configure a shared memory for storing information. At the time of processing of data, portions of the shared memory, for example in the form of frame buffers, may be allocated to the slave processors 204-208. The slave processors 204-208 upon completion of the processing of data may release the allocated frame buffers. It is further understood that standard memory access/allocation techniques may be utilized for accessing information from, or storing information into, the frame buffers 216-220. In an embodiment, one or more frame buffers from among the plurality of frame buffers 216-220 are shared between pairs of slave processors associated with successive processing stages from among the plurality of processing stages for enabling a provisioning of the processed data sub-frames from one slave processor to another slave processor for facilitating execution of a next processing stage. For example, the frame buffer 216 is depicted to be shared between pair of slave processors, such as the first slave processor 204 and the second slave processor 206 associated with successive processing stages, such as for example a first processing stage and a second processing stage, respectively. The pairs of slave processors associated with successive processing stages are also referred to herein as neighboring pairs of slave processors. Similarly, the frame buffer 218 is shared between a neighboring pair of slave processors, such as the second slave processor 206 and a third slave processor (not shown in FIG. 2) and so on and so forth. The sharing of frame buffers enables provisioning of the processed data sub-frames from one slave processor to another slave processor for facilitating execution of a next processing stage.

The system 200 further depicts a first application programming interface (API) module 222 and a second API module 224. In an embodiment, the first API module 222 is configured to facilitate communication in the form of messaging calls from the slave processors 204-208 to the host processor 202 and messaging calls from the host processor 202 to the slave processors 204-208. In an embodiment, the messaging calls correspond to API calls configured to facilitate communication between the host processor 202 and the plurality of slave processors 204-208. In an embodiment, the second API module 224 is configured to facilitate provisioning of messaging calls from one slave processor to the next slave processor. Such messaging calls correspond to API calls configured to facilitate communication between the slave processors 204-208. The communication between the slave processors 204-208 and the host processor 202, and, those between the slave processors 204-208, in the form of messaging calls may serve as frame buffer status messages and are explained in further detail with reference to FIGS. 3 and 4.

In an embodiment, one or more components of the system 200 such as the host processor 202, the plurality of slave processors 204-208, the first API module 222 and the second API module 224 are communicatively associated with each other via bus 226. Examples of the bus 226 may include, but is not limited to, a centralized circuit system, a data bus, a control bus and the like. The bus 226 may be, for example, a serial bus, a unidirectional bus or a bi-directional bus.

In accordance with an example implementation, the system 200 may either be a physical module (e.g., an integrated circuit chip or package) or a software module. In accordance with a second example implementation, however, the system 200 is a processing device (or processing machine) specifically configured to implement various embodiments of the present technology. In an embodiment, the system 200 may be included in an electronic device, such as for example, a personal computer, laptop, mobile phone, a tablet personal computer, a set-top box, a multimedia player and the like.

In an embodiment, various components of the system 200, such as the host processor 202, the plurality of slave processors 204-208, the data co-processors 210-214, the plurality of frame buffers 216-220, the first API module 222, the second API module 224 and the bus 226 may be implemented as hardware, software, firmware or any combination thereof. For example, one or more components of the system 200 (such as for example, the host processor 202 and the plurality of slave processors 204-208) may be embodied as a multi-core processor, a single-core processor, or a combination of one or more multi-core processors and one or more single-core processors. For example, one or more components of the system 200 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, one or more components of the system 200 may be configured to execute hard-coded functionality. In an embodiment, the one or more components of the system 200 may be embodied as an executor of software instructions, wherein the instructions may specifically configure the system 200 to perform the algorithms and/or operations described herein when the instructions are executed. One or more components of the system 200 may include, among other things, a clock, an arithmetic logic unit (ALU) and logic gates configured to support an operation of the system 200. An example processing of the data using the various components of the system 200 is explained with reference to FIGS. 3 and 4.

Figure 3:
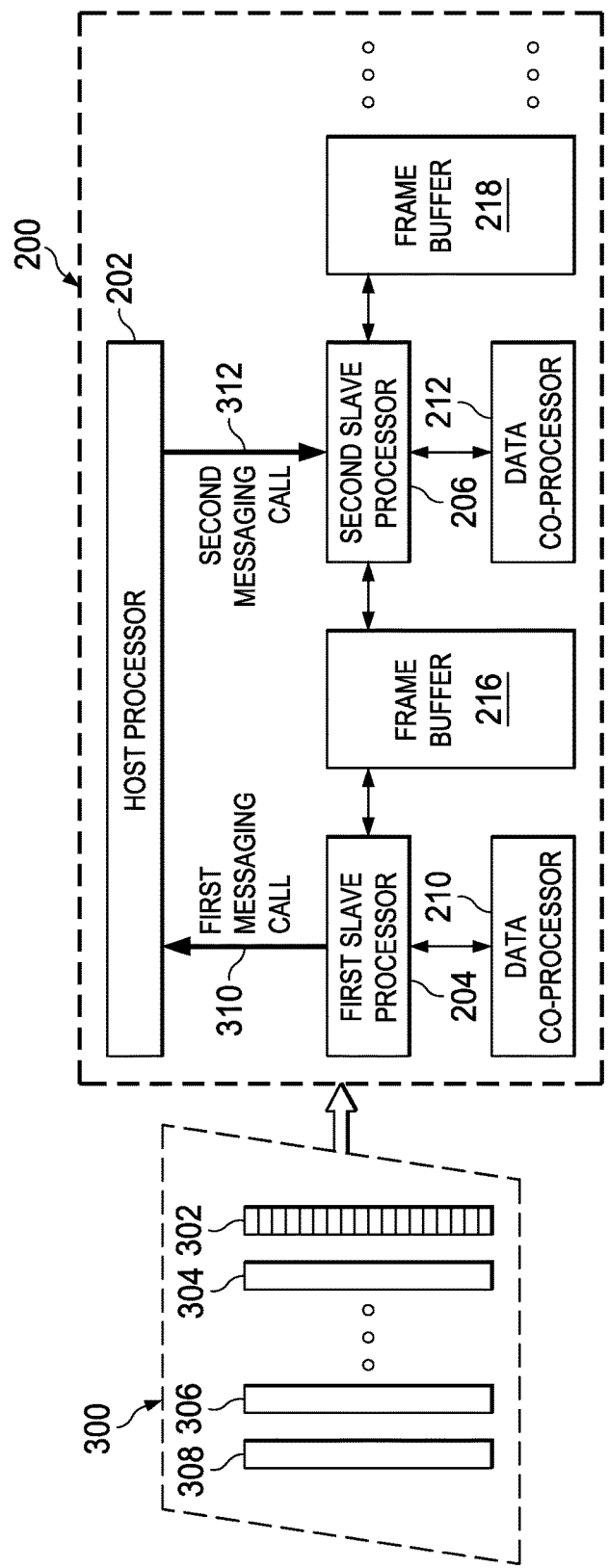
FIG. 3 depicts an example schematic block diagram for illustrating an example provisioning of first and second messaging calls between a host processor and slave processors in accordance with an embodiment.

FIG. 3 depicts an example schematic block diagram for illustrating an example provisioning of first and second messaging calls between a host processor and slave processors in accordance with an embodiment. The block schematic diagram depicts a portion of the system 200 depicted in FIG. 2. More specifically, the block schematic diagram depicts the host processor 202, the first slave processor 204, the second slave processor 206, the data co-processor 210, the data co-processor 212, the frame buffer 216 and the frame buffer 218. Moreover, in FIG. 3, the system 200 is exemplarily depicted to receive a frame 300 of data for processing purposes. The frame 300 may correspond to a video frame from among a plurality of video frames corresponding to video data. Alternatively, the frame 300 may correspond to an image frame. The frame 300 is depicted to include sub-frames, such as a sub-frame 302, a sub-frame 304 to a sub-frame 306 and a sub-frame 308. It is understood the system 200 receives a plurality of frames, such as the frame 300, and each such frame may be composed of a plurality of sub-frames. It is further understood, that a frame may be partitioned into a plurality of portions constituting the sub-frames using standard frame partitioning mechanisms, which are not discussed herein for sake of brevity. The system 200 is configured to perform processing of frame-related data at a sub-frame level to reduce a processing latency as explained with reference to FIG. 1. More specifically, the processing latency is reduced by enabling processing of next processing stage to start earlier upon reception of a processed sub-frame from a previous processing stage (for example, as opposed to waiting for a processing stage to complete processing of an entire frame and then initiate processing of the next processing stage).

In one embodiment, the host processor 202 is configured to receive the plurality of sub-frames, such as the sub-frames 302, 304, 306 and 308. The host processor 202 may receive the sub-frames from a memory device, internal to the system 200 (for example, the shared memory explained with the reference to FIG. 2) or, external to the system 200 (for example, memory of an electronic device, such as camera, laptop, personal computer and the like). The host processor 202 is further configured to provision the plurality of sub-frames in a processing order to a slave processor associated with a data co-processor corresponding to a first processing stage from among the plurality of processing stages. For example, in the schematic block diagram, the first slave processor 204 is associated with the data co-processor 210 configured to execute the first processing stage from among the plurality of processing stages. Accordingly, the host processor 202, upon receiving the plurality of sub-frames in the processing order may provision the sub-frames in the processing order to the first slave processor 204 (for example, by using the bus 226 depicted in FIG. 2). The first slave processor 204 may then provision the sub-frames to the data co-processor 210 for executing the first stage of processing of the sub-frames. In one embodiment, the plurality of sub-frames are provisioned, in a processing order, to a slave processor associated with a data co-processor corresponding to a first processing stage from among the plurality of processing stages (for example, the first slave processor 204). For example, the plurality of sub-frames may be provided to the first slave processor 204 while precluding an involvement of the host processor 202.

As explained above, the sub-frame 302 may be received by the first slave processor 204 (for example, through the host processor 202 or by precluding an involvement of the host processor 202). The first slave processor 204 may provision the sub-frame 302 to the data co-processor 210 for initiating an execution of a first processing stage. As explained with reference to FIG. 1, a processing stage, such as the first processing stage, may correspond to one of a video compression stage, a noise reduction stage, a de-interlacing stage, a scaling stage, a color correction stage, a video composition stage, a video decompression stage and the like. Upon processing the sub-frame 302 based on the first processing stage, the data co-processor 210 may provide the processed sub-frame 302 to the first slave processor 204. It is noted that the term 'processed sub-frame' as used herein or hereinafter refers to output data generated upon processing of a sub-frame based on a processing stage. For example, the processed sub-frame 302 as referred to herein implies output data generated upon processing of sub-frame 302 based on corresponding processing stage, such as for example, the first processing stage, the second processing stage and so forth.

Upon receiving the processed sub-frame 302 from the data co-processor 210, the first slave processor 204 may store the processed sub-frame 302 in the associated frame buffer, (for example, frame buffer 216). The first slave processor 204 is further configured to provision a first messaging call 310 to indicate a presence of a processed sub-frame 302 in the frame buffer 216 to the host processor 202. As explained above, a messaging call, such as the first messaging call 310 may serve as frame buffer status message corresponding to the associated frame buffer. The host processor 202, upon receiving the first messaging call 310, is configured to provision a second messaging call 312 to a next slave processor, for example second slave processor 206 for requesting the frame buffer 216 to be emptied for facilitating execution of the next processing stage, for example the second processing stage. As explained with reference to FIG. 2, the first API module 222 is configured to facilitate provisioning of messaging calls, such as the first messaging call 310 and the second messaging call 312, for enabling communication between the host processor 202 and the slave processors 204-208. In an embodiment, the messaging calls, such as the first messaging call 310 and the second messaging call 312 may be embodied as API calls. In an embodiment, the API calls may represent specific operations that various system components may invoke at runtime to perform tasks. For example, the first messaging call 310 may invoke the host processor 202 to provision the second messaging call 312, whereas the second messaging call 312 may invoke the second slave processor 206 to empty the frame buffer 216.

In an embodiment, upon receiving the second messaging call 312, the second slave processor 206 is configured to empty the frame buffer 216, or more specifically, receive the processed sub-frame 302, and provision the processed sub-frame 302 to the data co-processor 212 for initiating execution of the second processing stage. The data co-processor 212 is configured to process the processed sub-frame 302 based on the second processing stage and provision the processed sub-frame 302 (i.e. sub-frame 302 upon being processed based on the second processing stage) to the second slave processor 206. The second slave processor 206 is further configured to store the processed sub-frame 302 in the frame buffer 218. Upon storing the processed sub-frame 302 in the frame buffer 218, the second slave processor 206 may be further configured to provision a first messaging call, such as the first messaging call 310 to the host processor 202 to indicate the presence of the processed sub-frame 302 in the associated frame buffer (i.e. frame buffer 218). The host processor 202 may then provision a second messaging call, such as the second messaging call 312, to a third slave processor (not shown in the schematic block diagram) for requesting the third slave processor to empty the frame buffer 218. In an embodiment, the provisioning of the first messaging call 310 and the second messaging call 312 may be performed by the host processor/subsequent slave processors, until the processing of the first data sub-frame based on the plurality of processing stages is completed. More specifically, for the first data sub-frame, such as the sub-frame 302, the first messaging call 310 indicating a presence of processed first data sub-frame in an associated frame buffer is provisioned to the host processor 202 by each slave processor. The first messaging call 310 is provisioned subsequent to execution of a processing stage by an associated data co-processor. The host processor 202 is configured to provision the second messaging call 312 to a next slave processor upon receiving the first messaging call 310 for requesting the corresponding frame buffer to be emptied for facilitating execution of the next processing stage. The provisioning of the first messaging call 310 and the second messaging call 312 is performed until the processing of the sub-frame 302 based on the plurality of processing stages is completed. It is understood that though the $N^{th}$ slave processor provisions the first messaging call 310 to the host processor 202 subsequent to the execution of an associated processing stage (i.e. $N^{th}$ processing stage). Further, the $N^{th}$ slave processor stores the processed first sub-frame 302 in the associated frame buffer 220 (shown in FIG. 2). Thereafter, the host processor 202 may be configured to preclude provisioning the second messaging call 312 as the processing of the sub-frame 302 based on the plurality of processing stages is completed. The processing of sub-frames subsequent to the sub-frame 302, such as the sub-frames 304, 306 and 308 is further explained with reference to FIG. 4.

Figure 4:
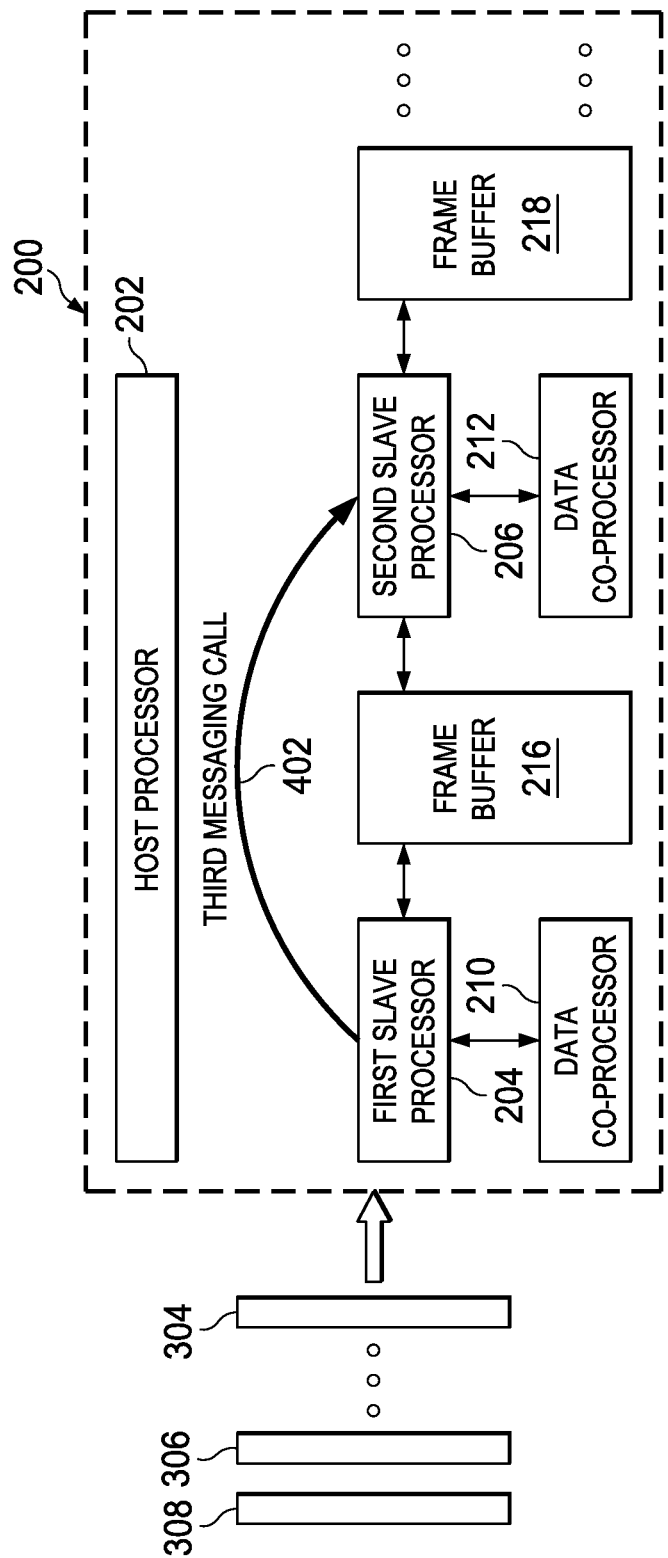
FIG. 4 depicts an example schematic block diagram for illustrating an example provisioning of a third messaging call between two slave processors in accordance with an embodiment.

FIG. 4 depicts an example schematic block diagram for illustrating an example provisioning of a third messaging call between two slave processors in accordance with an embodiment. The block schematic diagram depicts a portion of the system 200 depicted in FIG. 2. More specifically, the block schematic diagram depicts the host processor 202, the first slave processor 204, the second slave processor 206, the data co-processor 210, the data co-processor 212, the frame buffer 216 and the frame buffer 218. Moreover, in FIG. 4, the system 200 is depicted to receive one or more sub-frames subsequent to the sub-frame 302, such as the sub-frames 304, 306 and 308 of the frame 300 (depicted in FIG. 3) for processing purposes. As explained with reference to FIG. 3, the system 200 is configured to perform processing of frame-related data at a sub-frame level. More specifically, the processing latency is reduced by enabling processing of next processing stage to start earlier upon reception of a processed sub-frame from a previous processing stage (for example, as opposed to waiting for a processing stage to complete processing of an entire frame and then initiate processing of the next processing stage). Accordingly, the sub-frame 304 (i.e. the second sub-frame in the processing order) may be received by the first slave processor 204 (for example, through the host processor 202 or precluding an involvement of the host processor 202) upon completion of the first processing stage of the sub-frame 302 and provisioning of the processed sub-frame 302 to the next slave processor (i.e. the second slave processor 206). Similarly, the third sub-frame may be received by the first slave processor 204 upon completion of the first processing stage of the sub-frame 304 and provisioning of the processed sub-frame 304 to the next slave processor (i.e. the second slave processor 206). The processing of the sub-frames 304, 306 to 308 is explained hereinafter with reference to the sub-frame 304. It is understood that the sub-frames 306 to 308 may be similarly processed by the system 200.

In an illustrative example, upon receiving the sub-frame 304, the first slave processor 204 may provision the sub-frame 304 to the data co-processor 210 for initiating an execution of the first processing stage. As explained with reference to FIG. 1, a processing stage, such as the first processing stage, may correspond to one of a video compression stage, a noise reduction stage, a de-interlacing stage, a scaling stage, a color correction stage, a video composition stage, a video decompression stage and the like. Upon processing the sub-frame 304 based on the first processing stage, the data co-processor 210 may provide the processed sub-frame 304 to the first slave processor 204. The first slave processor 204 may store the processed sub-frame 304 in the associated frame buffer, (for example, frame buffer 216). The first slave processor 204 may provision a third messaging call 402 indicating a presence of the processed sub-frame 304 in the frame buffer 216 to a next slave processor, such as the second slave processor 206. Upon receiving the third messaging call 402, the second slave processor 206 is configured to empty the frame buffer 216, or more specifically, receive the processed sub-frame 304. The second slave processor 206 is further configured to provision the processed sub-frame 304 to the data co-processor 212 for initiating execution of the second processing stage. The data co-processor 212 is configured to process the processed sub-frame 304 based on the second processing stage and provision the processed sub-frame 304 (i.e. sub-frame 304 upon being processed based on the second processing stage) to the second slave processor 206. The second slave processor 206 is further configured to store the processed sub-frame 304 in the frame buffer 218. Upon storing the processed sub-frame 304 in the frame buffer 218, the second slave processor 206 may be further configured to provision the third messaging call 402 to a third slave processor (not shown in schematic block diagram) for requesting the third slave processor to empty the frame buffer 218. In an embodiment, the provisioning of the third messaging calls may be performed by the subsequent slave processors until the processing of the sub-frame 304 based on the plurality of processing stages is completed. The processing of the sub-frames subsequent to the sub-frames 304 may be performed as explained above. More specifically, for each data sub-frame subsequent to the first data sub-frame in each frame associated with data being processed, a third messaging call, such as the third messaging call 402, indicating a presence of processed data sub-frame in the associated frame buffer is provisioned to the next slave processor by each slave processor. The third messaging call 402 is provisioned subsequent to execution of the processing stage by the associated data co-processor for facilitating execution of the next processing stage, until the processing of the subsequent data sub-frame based on the plurality of processing stages is completed.

As explained with reference to FIG. 2, the second API module 224 is configured to facilitate provisioning messaging calls, such as the third messaging call 402, for enabling communication between the slave processors 204-208. In an embodiment, the third messaging call 402 may be embodied as an API call configured to invoke, for example, the next slave processor to empty the associated frame buffer.

Figure 5:
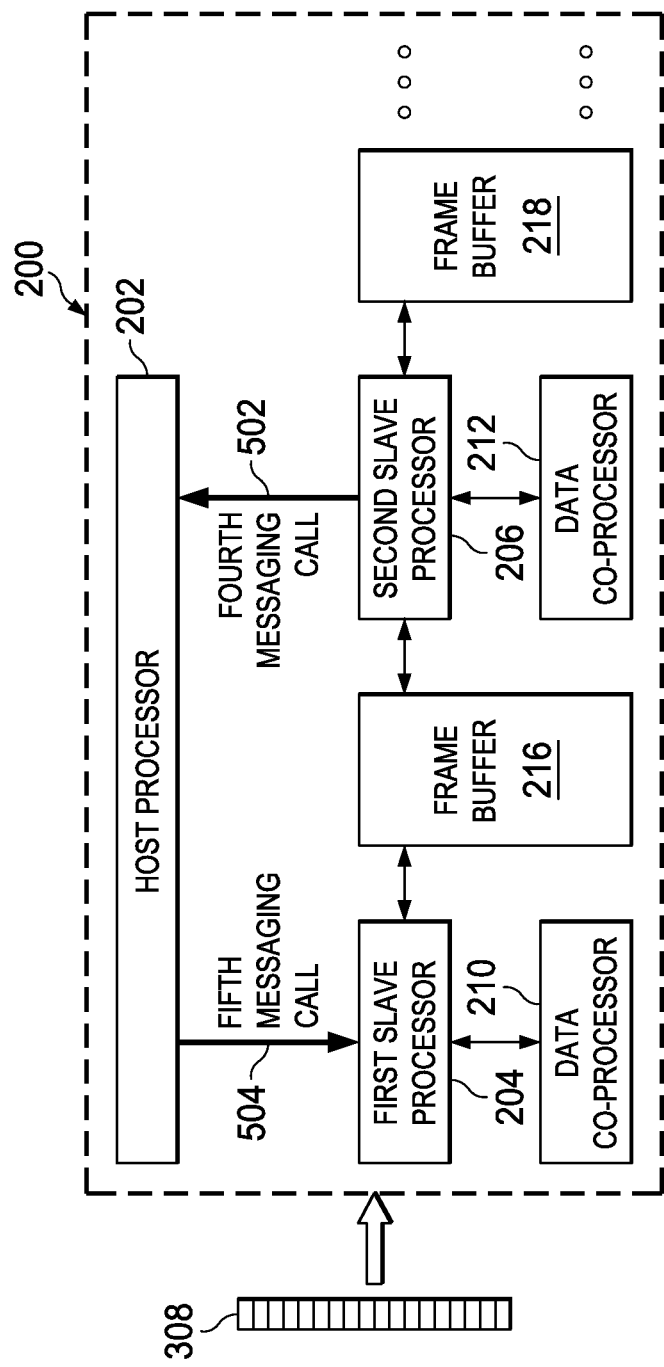
FIG. 5 depicts an example schematic block diagram for illustrating an example provisioning of fourth and fifth messaging calls between the host processor and the slave processors in accordance with an embodiment.

FIG. 5 depicts an example schematic block diagram for illustrating an example provisioning of fourth and fifth messaging calls between the host processor 202 and the slave processors 204-208 in accordance with an embodiment. The block schematic diagram depicts a portion of the system 200 depicted in FIG. 2. More specifically, the block schematic diagram depicts the host processor 202, the first slave processor 204, the second slave processor 206, the data co-processor 210, the data co-processor 212, the frame buffer 216 and the frame buffer 218. The processing of the sub-frames until the last sub-frame 308 may be performed as explained with reference to FIGS. 3 and 4.

As explained with reference to FIG. 2, portions of the shared memory, for example in the form of frame buffers, may be allocated to the slave processors 204-208 at the time of processing of data. The slave processors 204-208 upon completion of the processing of data may release the allocated frame buffers. Accordingly, upon completion of the processing of a corresponding processing stage for a last data sub-frame, such as the sub-frame 308, by the associated data co-processor and provisioning of the processed sub-frame 308 to the next slave processor, each slave processor may provision a fourth messaging call, such as the fourth messaging call 502 to the host processor 202 thereby signaling the release of the associated frame buffer. The host processor 202 may further be configured to provision a fifth messaging call 504 to a previous slave processor upon receiving the fourth messaging call 502 for facilitating a utilization of the associated frame buffer for receiving a data sub-frame corresponding to a next frame.

Accordingly, the schematic block diagram depicts a provisioning of the last sub-frame 308 to the system 200. The first slave processor 204 upon receiving the last sub-frame 308 may facilitate processing of the last sub-frame 308 based on the first processing stage using the data coprocessor 210 and store the processed last sub-frame 308 (i.e. output data generated upon processing the sub-frame 308 based on the first processing stage) in the frame buffer 216. The first slave processor 204 may further provision a third messaging call, such as the third messaging call 402 explained with reference to FIG. 4, to the second slave processor 206, which may then receive the processed sub-frame 308 from the frame buffer 216 and provide the processed sub-frame 308 to the data co-processor 212 for processing based on the second processing stage. Upon processing of the processed sub-frame 308, the processed sub-frame 308 may be stored in the frame buffer 218 for facilitating execution based on the third processing stage. The second slave processor 206 may then provision the fourth messaging call 502 to the host processor 202 signaling the release of the frame buffer 216. The host processor 202 upon receiving the fourth messaging call 502 from the second slave processor 206, may provision a fifth messaging call 504 to the previous slave processor, i.e. the first slave processor 204 for facilitating a utilization of the frame buffer 216 for receiving a data sub-frame corresponding to a next frame, or more specifically, the first data sub-frame of the next frame.

In an embodiment, each slave processor, subsequent to the first slave processor 204, is configured to provision the fourth messaging call 502 to the host processor 202 upon execution of an associated processing stage for a last sub-frame of a frame of data being processed. The fourth messaging call 502 may be provisioned for signaling a release of a frame buffer shared with the previous slave processor. Further, the host processor 202 is configured to provision the fifth messaging call 504 to each slave processor (barring the $N^{th}$ slave processor) for facilitating a utilization of the released frame buffer.

As explained with reference to FIG. 2, the first API module 222 is configured to facilitate provisioning of messaging calls for enabling communication between the slave processors 204-208 and the host processor 202. Accordingly, the first API module 222 may be configured to facilitate provisioning of the fourth messaging call 502 and the fifth messaging call 504. In an embodiment, the fourth messaging call 502 and the fifth messaging call 504 may be embodied as API calls configured to invoke, for example, the host processor 202 to de-allocate a frame buffer from a slave processor and re-allocate the frame buffer to a previous slave processor, respectively.

In an embodiment, sending of messaging calls in such a manner (i.e. involving the host processor 202 at a frame level, for example for the first sub-frame and the last sub-frame, while precluding an involvement of the host processor 202 at a sub-frame level, for example, the intermediate sub-frames between the first sub-frame and the last sub-frame), reduces processing cycles (or loading) of the host processor 202, thereby improving a performance of the host processor 202. A method for data processing is explained with reference to FIG. 6.

Figure 6:
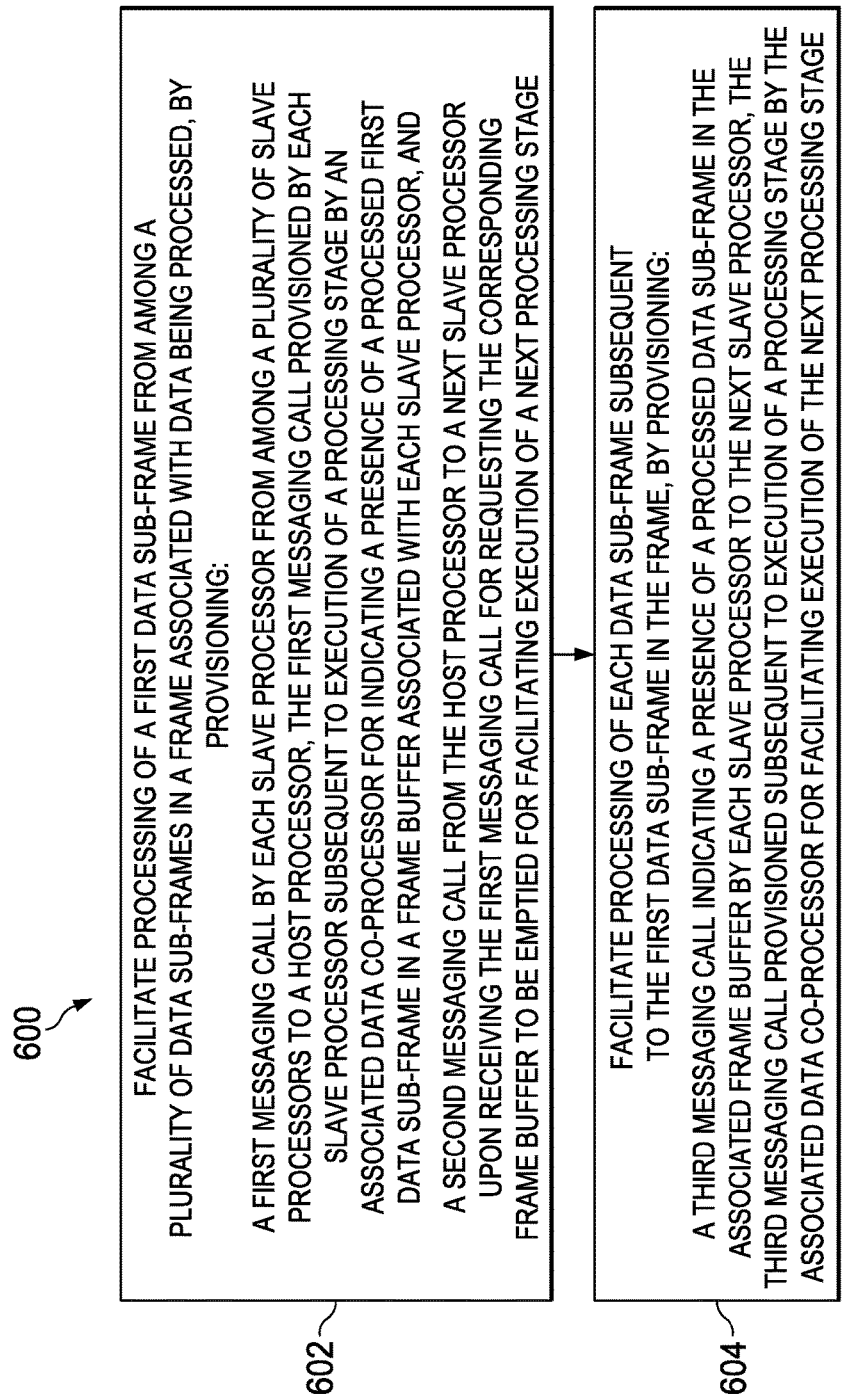
FIG. 6 illustrates a flow diagram of an example data processing method in accordance with an example embodiment.

FIG. 6 illustrates a flow diagram of an example data processing method 600 (hereinafter referred to as method 600) in accordance with an example embodiment. Operations of the flow diagram, and combinations of operation in the flow diagram, may be implemented by, for example, hardware, firmware, a processor, circuitry and/or a different device associated with the execution of software that includes one or more computer program instructions. The operations of the method 600 are described herein with help of the system 200. However, the operations of the method 600 can be described and/or practiced by using any system other than the system 200. The method 600 starts at operation 602.

At operation 602, a processing of a first data sub-frame from among a plurality of data sub-frames in a frame associated with data being processed, is facilitated by provisioning a first messaging call by each slave processor from among a plurality of slave processors to a host processor (for example, the host processor 202 explained with reference to FIG. 2). In an embodiment, the plurality of slave processors is communicatively associated with the host processor (for example, by using a bus, such as the bus 226 explained with reference to FIG. 2). Each slave processor is associated with at least one data co-processor (such as the data co-processors 210-214 explained with reference to FIG. 2). Each data co-processor is configured to process data sub-frames based on one processing stage from among a plurality of processing stages and provision said processed data sub-frames to a corresponding slave processor. More specifically, each data co-processor is configured to execute a processing stage by processing frames/sub-frames based on the associated processing stage and provide the processed sub-frames (i.e. output data corresponding to the processed sub-frames) to the corresponding slave processor. For example, a data co-processor may be configured to execute a compression stage from among a plurality of processing stages associated with a video processing pipeline. Accordingly, upon receiving a frame/sub-frame corresponding to video data, the data co-processor may compress the frame/sub-frame as per the requirement associated with the corresponding stage (i.e. the compression stage) and provide the compressed frame/sub-frame to the corresponding slave processor. In an embodiment, each data co-processor is a hardware accelerator configured to execute one processing stage associated with processing of the video data. As explained with reference to FIG. 1, a processing stage associated with the video data may be one from among, but not limited to, a video compression stage, a video decompression stage, an interlacing stage, a noise filter stage, a video composition stage and a video decomposition stage.

The first messaging call (such as the first messaging call 310 explained with reference to FIG. 3) is provisioned by the slave processor subsequent to execution of a processing stage by an associated data co-processor for indicating a presence of a processed first data sub-frame in a frame buffer associated with each slave processor. The frame buffer is one from among a plurality of frame buffers (such as the plurality of frame buffers 216-220 explained with reference to FIG. 2) shared between pairs of slave processors associated with successive processing stages from among a plurality of processing stages. The sharing of the frame buffers between neighboring pairs of slave processors is explained with reference to FIG. 2 and is not explained herein.

The processing of the first sub-frame is further facilitated by provisioning a second messaging call (such as the second messaging call 312 explained with reference to FIG. 3) by the host processor to a next slave processor upon receiving the first messaging call for requesting the corresponding frame buffer to be emptied for facilitating execution of the next processing stage. In an embodiment, the provisioning of the first and the second messaging calls is performed until the processing of the first data sub-frame based on the plurality of processing stages is completed. The provisioning of frame buffer status messages between the host processor and the slave processors in the form of the first messaging call and the second messaging call for facilitating a processing of the first data sub-frame through a plurality of processing stages may be performed as explained with reference to FIG. 3 and is not explained herein.

In an embodiment, a first API module (such as the first API module 222 explained with reference to FIG. 2) may be provided to facilitate provisioning of the first messaging call and the second messaging call for enabling communication between the slave processors and the host processor. In an embodiment, the messaging calls correspond to API calls configured to facilitate communication between the host processor and the plurality of slave processors.

At operation 604 of the method 600, a processing of each data sub-frame subsequent to the first data sub-frame in the frame, is facilitated by provisioning a third messaging call (such as the third messaging call 402 explained with reference to FIG. 4) by each slave processor to the next slave processor. The third messaging call is provisioned subsequent to execution of the processing stage by the associated data co-processor to indicate a presence of processed data sub-frame in the associated frame buffer. In an embodiment, the second API module (such as the second API module 224 explained with reference to FIG. 2), is provided to facilitate provisioning of messaging calls (such as the third messaging call 402 explained with reference to FIG. 4) from one slave processor to the next slave processor. Such messaging calls correspond to API calls configured to facilitate communication between the slave processors. In an embodiment, the provisioning of the third messaging call is performed until the processing of each data sub-frame subsequent to the first data sub-frame based on the plurality of processing stages is completed.

In an embodiment, the method 600 further includes provisioning of a fourth messaging call (such as a fourth messaging call 502 explained with reference to FIG. 5) signaling a release of an associated frame buffer by each slave processor to the host processor subsequent to receiving a last data sub-frame from the associated frame buffer and executing the corresponding processing stage by the associated data co-processor. In an embodiment, the method 600 further includes provisioning of a fifth messaging call (such as the fifth messaging call 504 explained with reference to FIG. 5) by the host processor to a previous slave processor upon receiving the fourth messaging call for facilitating a utilization of the associated frame buffer by the previous slave processor for receiving a data sub-frame corresponding to a next frame. As explained with reference to FIG. 2, portions of the shared memory, for example in the form of frame buffers, may be allocated to the slave processors at the time of processing of data. The slave processors upon completion of the processing of data may release the allocated frame buffers. Accordingly, upon completion of the processing of a corresponding processing stage for a last data sub-frame by the associated data co-processor and provisioning of the processed sub-frame to the next slave processor, each slave processor may provision a fourth messaging call to the host processor thereby signaling the release of the associated frame buffer. The host processor may further be configured to provision a fifth messaging call to a previous slave processor upon receiving the fourth messaging call for facilitating a utilization of the associated frame buffer for receiving a data sub-frame corresponding to a next frame. Further, as explained with reference to FIG. 2, the first API module 222 is configured to facilitate provisioning of messaging calls, such as the fourth messaging call 502 and the fifth messaging call 504, for enabling communication between the slave processors and the host processor. In an embodiment, the fourth and the fifth messaging calls may be embodied as API calls configured to invoke, for example, the host processor to de-allocate the associated frame buffer.

Without in any way limiting the scope, interpretation, or application of the claims appearing below, advantages of one or more of the example embodiments disclosed herein include reducing processing cycles of the host processor to improve the performance of the host processor. Accordingly, a non-tunneled architecture (for example, exchanging data between the high level framework and the low level framework) is executed only at a frame level, whereas a tunneled architecture is proposed at a sub-frame level. More specifically, messaging/API calls are sent involving the host processor at a frame level, for example for the first sub-frame and the last sub-frame, while precluding an involvement of the host processor at a sub-frame level, for example, sub-frames between the first sub-frame and the last sub-frame, to reduce a processing cycles (or loading) of the host processor thereby improving a performance of the processor. In an illustrative example, sending messaging/API calls at a frame level during data processing involving two processing stages may involve about 15 million cycles, whereas dividing the frames into four sub-frames each to reduce latency may involve about 60 million cycles on host processor if all sub-frames are passed through the high level framework. However, utilizing a non-tunneled architecture at a frame level and a tunneled architecture at a sub-frame level as disclosed herein may involve only 15 million cycles on the host processor, reducing processing cycles of the host processor, in turn improving the performance of the host processor.

Although the present technology has been described with reference to specific example embodiments, it is noted that various modifications and changes may be made to these embodiments without departing from the broad spirit and scope of the present technology. For example, the various systems, modules, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the various electrical structures and methods may be embodied using transistors, logic gates, and electrical circuits (for example, application specific integrated circuit (ASIC) circuitry and/or in Digital Signal Processor (DSP) circuitry).

Particularly, the system 200, the host processor 202, the plurality of slave processors 204-208, the plurality of data co-processors 210-214, the plurality of frame buffers 216-220, the first API module 222, the second API module 224 and the bus 226 of the system 200 may be enabled using software and/or using transistors, logic gates, and electrical circuits (for example, integrated circuit circuitry such as ASIC circuitry).

Also, techniques, devices, subsystems and methods described and illustrated in the various embodiments as discrete or separate may be combined or integrated with other systems, modules, techniques, or methods without departing from the scope of the present technology. Other items shown or discussed as directly coupled or communicating with each other may be coupled through some interface or device, such that the items may no longer be considered directly coupled with each other but may still be indirectly coupled and in communication, whether electrically, mechanically, or otherwise, with one another. Other examples of changes, substitutions, and alterations ascertainable by one skilled in the art, upon or subsequent to studying the example embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these example embodiments, it is noted that certain modifications, variations, and alternative constructions may be apparent and well within the spirit and scope of the technology. Although various example embodiments of the present technology are described herein in a language specific to structural features and/or methodological acts, the subject matter defined in the appended claims is not necessarily limited to the specific features or acts described above. Rather, the specific features and acts described above are disclosed as example forms of implementing the claims.

What is claimed is:

1. A data processing system comprising:
    a host processor;
    a plurality of slave processors communicatively associated with the host processor, each slave processor associated with at least one data co-processor, each data co-processor configured to process data sub-frames based on one processing stage from among a plurality of processing stages and provision said processed data sub-frames to a corresponding slave processor; and
    a plurality of frame buffers, wherein one or more frame buffers from among the plurality of frame buffers are shared between pairs of slave processors associated with successive processing stages from among the plurality of processing stages, and, wherein
    for a first data sub-frame from among a plurality of data sub-frames in a frame associated with data being processed, a first messaging call indicating a presence of a processed first data sub-frame in an associated frame buffer is provisioned to the host processor by each slave processor subsequent to execution of a processing stage by an associated data co-processor, and the host processor is configured to provision a second messaging call to a next slave processor upon receiving the first messaging call for requesting the corresponding frame buffer to be emptied for facilitating execution of a next processing stage, the provisioning of the first messaging call and the second messaging call performed until the processing of the first data sub-frame based on the plurality of processing stages is completed and, wherein
    for each data sub-frame subsequent to the first data sub-frame in the frame, a third messaging call indicating a presence of a processed data sub-frame in the associated frame buffer is provisioned to the next slave processor by each slave processor subsequent to execution of the processing stage by the associated data co-processor for facilitating execution of the next processing stage until the processing of each data sub-frame subsequent to the first data sub-frame based on the plurality of processing stages is completed.

2. The system of claim 1, wherein subsequent to receiving a last data sub-frame from among the plurality of data sub-frames from a frame buffer and executing the corresponding processing stage by the associated data co-processor, a slave processor is configured to provision a fourth messaging call to the host processor for signaling a release of the said frame buffer, and, wherein the host processor is configured to provision a fifth messaging call to a previous slave processor upon receiving the fourth messaging call for facilitating a utilization of the said frame buffer for receiving a data sub-frame corresponding to a next frame.

3. The system of claim 2, further comprising a first application programming interface (API) module configured to facilitate provisioning of the first messaging call and the second messaging call, wherein the first messaging call and the second messaging call correspond to API calls configured to facilitate communication between the host processor and the plurality of slave processors.

4. The system of claim 3, wherein the first API module is further configured to facilitate provisioning of the fourth messaging call and the fifth messaging call, wherein the fourth messaging call and the fifth messaging call correspond to said API calls configured to facilitate communication between the host processor and the plurality of slave processors.

5. The system of claim 3, further comprising a second API module configured to facilitate provisioning of the third messaging call, wherein the third messaging call corresponds to an API call configured to facilitate communication between two slave processors from among the plurality of slave processors.

6. The system of claim 1, wherein the data corresponds to one of image data and video data.

7. The system of claim 1, wherein each data co-processor is a hardware accelerator configured to execute a processing stage associated with processing of video data.

8. The system of claim 7, wherein the processing stage associated with the video data is one from among a video compression stage, a video decompression stage, an interlacing stage, a noise filter stage, a video composition stage and a video decomposition stage.

9. The system of claim 1, wherein the plurality of data sub-frames are provisioned to the host processor and the host processor is further configured to provision the plurality of data sub-frames in a processing order to a slave processor associated with a data co-processor corresponding to a first processing stage from among the plurality of processing stages.

10. The system of claim 1, wherein the plurality of data sub-frames are provisioned, in a processing order, to a slave processor associated with a data co-processor corresponding to a first processing stage from among the plurality of processing stages.

11. A data processing method comprising:
    facilitating processing of a first data sub-frame from among a plurality of data sub-frames in a frame associated with data being processed by provisioning:
        a first messaging call by each slave processor from among a plurality of slave processors to a host processor, each slave processor associated with at least one data co-processor, each data co-processor configured to process data sub-frames based on one processing stage from among a plurality of processing stages and provision said processed data sub-frames to a corresponding slave processor, the first messaging call provisioned by each slave processor subsequent to execution of a processing stage by an associated data co-processor for indicating a presence of a processed first data sub-frame in a frame buffer associated with each slave processor, the frame buffer from among a plurality of frame buffers shared between pairs of slave processors associated with successive processing stages from among the plurality of processing stages, and a second messaging call from the host processor to a next slave processor upon receiving the first messaging call for requesting the corresponding frame buffer to be emptied for facilitating execution of a next processing stage, wherein the provisioning of the first messaging call and the second messaging call between the host processor and plurality of slave processors is performed until the processing of the first data sub-frame based on the plurality of processing stages is completed; and facilitating processing of each data sub-frame subsequent to the first data sub-frame in the frame, by provisioning a third messaging call indicating a presence of a processed data sub-frame in the associated frame buffer by each slave processor to the next slave processor subsequent to execution of the processing stage by the associated data co-processor for facilitating execution of the next processing stage until the processing of each data sub-frame subsequent to the first data sub-frame based on the plurality of processing stages is completed.

12. The method of claim 11, further comprising provisioning:

a fourth messaging call by each slave processor to the host processor subsequent to receiving a last data sub-frame from among the plurality of data sub-frames from an associated frame buffer and executing the corresponding processing stage by the associated data co-processor, the fourth messaging call provisioned for signaling a release of the said frame buffer; and a fifth messaging call by the host processor to a previous slave processor upon receiving the fourth messaging call for facilitating a utilization of the said frame buffer by the previous slave processor for receiving a data sub-frame corresponding to a next frame.

13. The method of claim 12, wherein provisioning of the first messaging call and the second messaging call is facilitated by a first application programming interface (API) module, wherein the first messaging call and the second messaging call correspond to API calls configured to facilitate communication between the host processor and the plurality of slave processors.

14. The method of claim 13, wherein the first API module is further configured to facilitate provisioning of the fourth messaging call and the fifth messaging call, wherein the fourth messaging call and the fifth messaging call correspond to said API calls configured to facilitate communication between the host processor and the plurality of slave processors.

15. The method of claim 13, wherein provisioning of the third messaging call is facilitated by a second API module, wherein the third messaging call corresponds to an API call configured to facilitate communication between two slave processors from among the plurality of slave processors.

16. The method of claim 11, wherein each data co-processor from among the at least one data co-processor is a hardware accelerator configured to execute a processing stage associated with processing of video data.

17. A data processing system comprising:

a host processor;

a plurality of slave processors communicatively associated with the host processor, wherein each slave processor from among the plurality of slave processors is configured to facilitate processing of data sub-frames based on one processing stage from among a plurality of processing stages to generate processed data sub-frames; and a plurality of frame buffers, wherein at least one frame buffer is shared between pairs of slave processors associated with successive processing stages from among the plurality of processing stages, wherein each slave processor from among the plurality of slave processors is configured to store said processed data sub-frames in a shared frame buffer, and wherein for a first data sub-frame from among a plurality of data sub-frames associated with each frame of data being processed, messaging calls are exchanged between the host processor and the plurality of slave processors for facilitating processing of the first data sub-frame based on the plurality of processing stages, and, wherein for each data sub-frame subsequent to the first data sub-frame in the each frame, messaging calls are exchanged between the slave processors associated with successive processing stages for facilitating processing of the said each data sub-frame based on the plurality of processing stages.

18. The system of claim 17, wherein each slave processor is associated with a data co-processor, and, wherein each data co-processor is configured to process the data sub-frames based on a processing stage associated with the corresponding slave processor and provision said processed data sub-frames to the corresponding slave processor for subsequent storing in the shared frame buffer.

19. The system as claimed in claim 17, wherein the said messaging calls exchanged between the host processor and the plurality of slave processors comprise:

a first messaging call indicating a presence of a processed first data sub-frame in an associated frame buffer, the first messaging call provisioned to the host processor by each slave processor subsequent to storage of a processed first data sub-frame in the associated frame buffer by the each slave processor; and a second messaging call by the host processor to a next slave processor upon receiving the first messaging call for requesting the corresponding frame buffer to be emptied for facilitating execution of a next processing stage, the provisioning of the first messaging call and the second messaging call performed until the processing of the first data sub-frame based on the plurality of processing stages is completed.

20. The system as claimed in claim 17, wherein the said messaging calls exchanged between the slave processors associated with successive processing stages comprise:

a third messaging call indicating a presence of a processed data sub-frame in the associated frame buffer, the third messaging call provisioned to the next slave processor by each slave processor subsequent to storage of a processed data sub-frame in the associated frame buffer by the each slave processor for facilitating execution of the next processing stage until the processing of each data sub-frame subsequent to the first data sub-frame based on the plurality of processing stages is completed.

* * * * *